United States Patent
Huang et al.

(10) Patent No.: US 10,660,067 B2
(45) Date of Patent: May 19, 2020

(54) SYSTEMS AND METHODS FOR EFFICIENT SIGNALING OF IOT DEVICES IN A WIRELESS TELECOMMUNICATIONS NETWORK

(71) Applicant: Verizon Patent and Licensing Inc., Arlington, VA (US)

(72) Inventors: Ye Huang, San Ramon, CA (US); Yee Sin Chan, San Jose, CA (US); Craig A. Barth, Roanoke, TX (US); Priscilla Lau, Concord, CA (US); Lei Song, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 10 days.

(21) Appl. No.: 16/114,800

(22) Filed: Aug. 28, 2018

(65) Prior Publication Data
US 2020/0077361 A1    Mar. 5, 2020

(51) Int. Cl.
*H04L 12/28* (2006.01)
*H04W 68/02* (2009.01)
*H04L 29/06* (2006.01)
*H04J 1/16* (2006.01)
*H04W 88/06* (2009.01)

(52) U.S. Cl.
CPC ......... *H04W 68/02* (2013.01); *H04L 65/1063* (2013.01); *H04W 88/06* (2013.01)

(58) Field of Classification Search
CPC .......................... H04W 68/02; H04L 65/1063
USPC ......................................... 370/252, 278, 389
See application file for complete search history.

(56) References Cited

U.S. PATENT DOCUMENTS

| | | | | |
|---|---|---|---|---|
| 2016/0286385 A1* | 9/2016 | Ryu | ...................... | H04W 76/28 |
| 2018/0054799 A1* | 2/2018 | Starsinic | ........... | H04W 52/0219 |
| 2018/0279115 A1* | 9/2018 | Tanna | ..................... | H04W 8/04 |

* cited by examiner

*Primary Examiner* — John Pezzlo

(57) ABSTRACT

A system described herein may provide a mechanism for efficiently delivering messages to a User Equipment ("UE") associated with a wireless telecommunications network, such as a UE that is frequently in an inactive state. A message for the UE may be received and buffered. Once the network determines that the UE has transitioned from the inactive state to the active state (e.g., as detected by a Mobility Management Entity ("MME") or an Access and Mobility Management Function ("AMF")), the buffered message may be provided to the UE using control plane signaling.

20 Claims, 7 Drawing Sheets

SYSTEMS AND METHODS FOR EFFICIENT SIGNALING OF IOT DEVICES IN A WIRELESS TELECOMMUNICATIONS NETWORK

BACKGROUND

Wireless telecommunications networks may be used to send or receive communications from Internet of Things ("IoT") devices. IoT devices may typically send or receive relatively small amounts of data on a relatively intermittent basis, when compared to other types of devices, such as mobile telephones, tablet computers, content streaming devices, etc. For example, an IoT device may include a sensor, such as a temperature sensor, and may communicate temperature readings to an application server on a daily, weekly, or some other intermittent basis.

DETAILED DESCRIPTION OF THE PREFERRED EMBODIMENTS

The following detailed description refers to the accompanying drawings. The same reference numbers in different drawings may identify the same or similar elements.

Some types of devices, such as IoT devices, may communicate (e.g., send and/or receive data) via a wireless telecommunications network (e.g., a cellular network, a Third Generation Partnership Project ("3GPP") Fourth Generation ("4G") network, a Fifth Generation ("5G") network, etc.). In many instances, IoT devices (such as devices with Extended Discontinuous Reception ("eDRX") and/or Power Saving Mode ("PSM")) have an "inactive" status with a network, and/or may be otherwise unreachable (e.g., may not have an active connection to the network, and/or the network may otherwise recognize the device as "idle" or "inactive") for a majority of the time, may briefly "wake up" (e.g., become active, establish a connection with the network, etc.) to send and/or receive data via the network, and then return to the "inactive" status. As described in more detail below, sending data to such a device may be problematic, as it may take longer to send the data to the device than the device is active (e.g., a device may be active for 1 second, while sending the data to the device may take 2 seconds).

Figure 1:
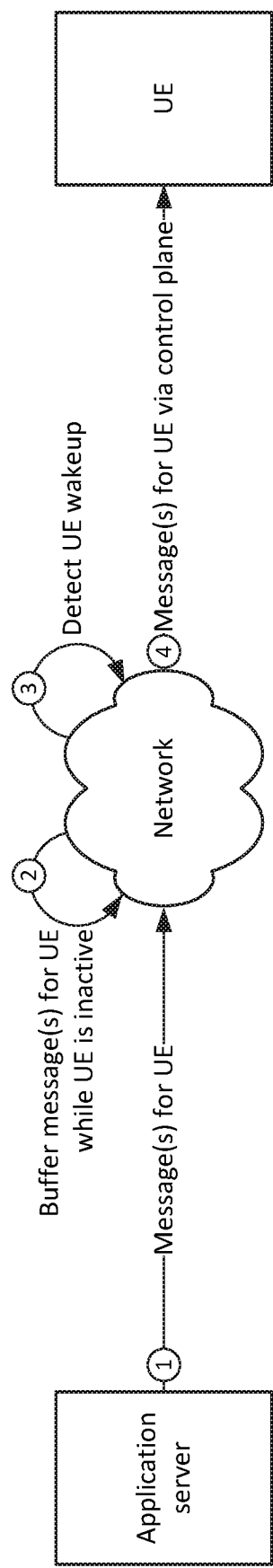
FIG. 1 illustrates an example overview of one or more embodiments described herein, in which messages may be efficiently delivered to a device that is inactive.

As shown in FIG. 1, for example, an application server may output (at 1) one or more messages for a device (shown in FIG. 1 as a User Equipment ("UE")). The message may include, for example, a request for information from the UE. For instance, in situations where the UE includes (or is) an IoT device, such as a temperature sensor, the application server may request one or more temperature readings measured by the temperature sensor. In this example, assume that the UE is inactive (e.g., not connected to the network) at the time the message(s) is/are sent from the application server toward the UE. In accordance with some embodiments, one or more devices of the network may recognize that the UE is inactive, and may buffer (at 2) the message(s). At some point after buffering the message(s), one or more devices of the network may detect (at 3) that the UE has become active (or has "woken up"). Based on detecting that the UE has become active, the network may forward (at 4) the message(s) from the application server to the UE. In some embodiments, the network may provide the message (s) via control plane signaling (e.g., as opposed to user plane signaling). For instance, as discussed below, the message(s) may be received via a device or system that assists in paging and mobility management, such as a Mobility Management Entity ("MME"), an Access and Mobility Management Function ("AMF"), or the like. In some embodiments, the message may include an application layer (e.g., Open Systems Interconnect ("OSI") layer 7) message, such as a message according to the DIAMETER protocol. In some embodiments, after the UE receives the message from the application server, the UE may send a reply message (e.g., a message that includes information requested by the application server) before the UE returns to the inactive state. As discussed below, this technique improves the speed at which messages are communicated to the UE, and thus ensures that the messages are delivered before the UE returns to an inactive state.

Figure 2:
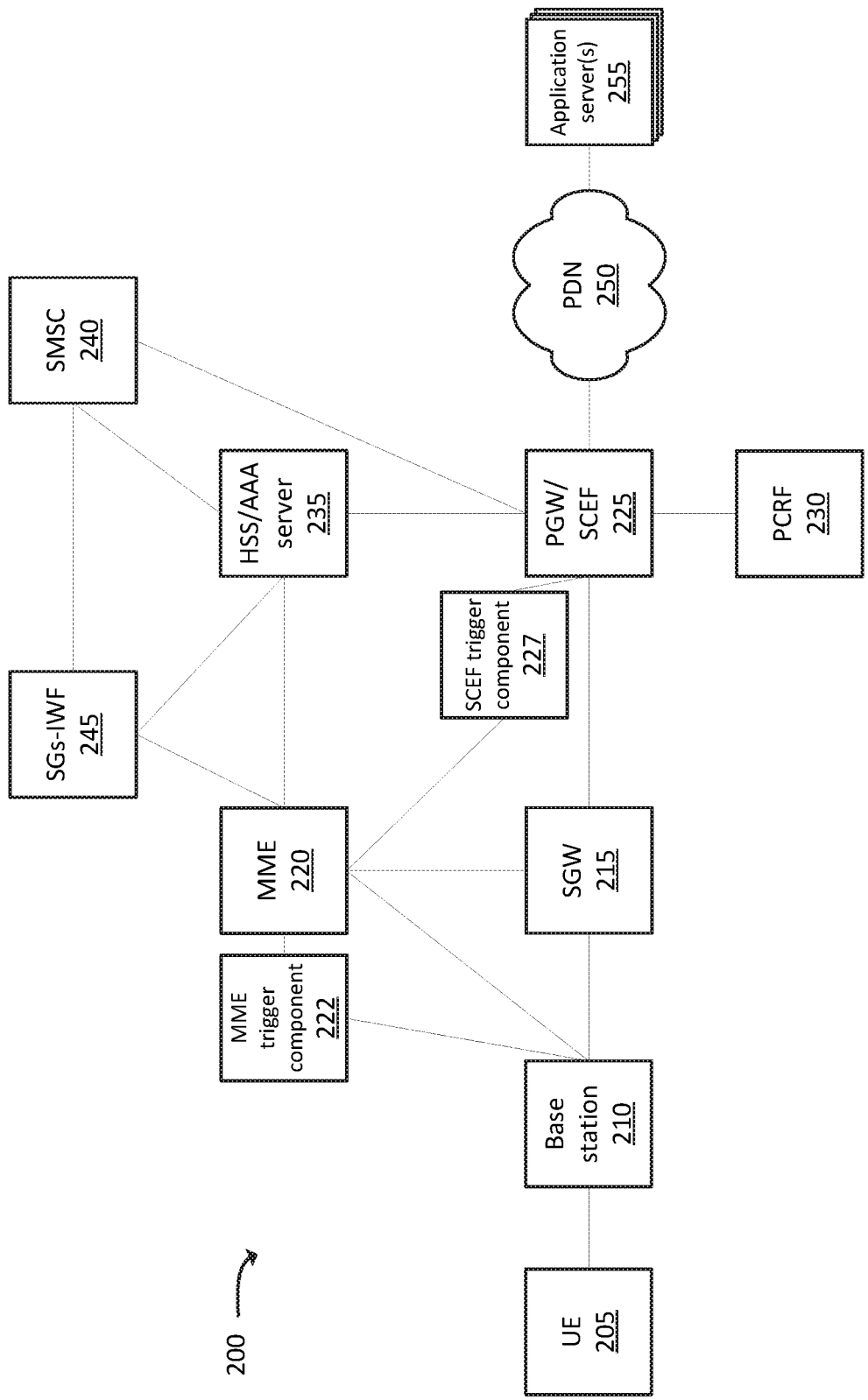
FIGS. 2 and 3 illustrate example environments in which one or more embodiments, described herein, may be implemented.

FIG. 2 illustrates example environment 200, in which systems and/or methods described herein may be implemented. As shown in FIG. 2, environment 200 may include UE 205, base station 210, Serving Gateway ("SGW") 215, Mobility Management Entity ("MME") 220, MME trigger component 222, PDN gateway ("PGW") and/or Service Capability Exposure Function ("SCEF") (referred to herein as "PGW/SCEF," or sometimes simply as "SCEF") 225, policy and charging rules function ("PCRF") 230, home subscriber server ("HS S")/authentication, authorization, accounting ("AAA") server 235 (hereinafter referred to as "HSS/AAA server 235"), Short Message Service Center ("SMSC") 240, SGs-Interworking Function ("SGs-IWF") 245, PDN 250, and one or more application servers 255.

While "direct" connections are shown in FIG. 2 between certain devices, some devices may communicate with each other via one or more intermediary devices (e.g., routers, switch, hubs, etc.) or networks (e.g., an Ethernet backhaul network ("EBH") and/or some other type of network). Furthermore, some of the connections shown in FIG. 2 may be logical connections, and may represent the communication between different logical portions of a single device. Further, in some implementations, some devices, shown in FIG. 2, may communicate with each other even though connections are not shown between such devices in the figure.

Environment 200 may include an evolved packet system ("EPS") that includes a Third Generation Partnership Project ("3GPP") radio access network ("RAN") and/or an Evolved Packet Core ("EPC") network that is operated based on a 3GPP wireless communication standard. The RAN may be, or may include, a Long-Term Evolution ("LTE") network, a fifth generation ("5G") RAN, etc., that each include one or more base stations 210 (which may take the form of evolved NodeBs ("eNBs")), via which UE 205 may communicate with the EPC network. The EPC network may include one or more SGWs 215, PGW/SCEFs 225, and/or MMES 220, and may enable UE 205 to communicate with PDN 250 and/or an Internet protocol ("IP") multimedia subsystem ("IMS") core network (not shown). The IMS core network may include and/or communicate with HSS/AAA server 235, and may manage authentication, session initiation, account information, a user profile, etc., associated with UE 205.

UE 205 may include a computation and communication device, such as a wireless mobile communication device that is capable of communicating with base station 210 and/or PDN 250. UE 205 may be, or may include, a radiotelephone; a personal communications system ("PCS") terminal (e.g., a device that combines a cellular radiotelephone with data processing and data communications capabilities); a personal digital assistant ("PDA") (e.g., a device that may include a radiotelephone, a pager, Internet/intranet access, etc.); a smart phone; a laptop computer; a tablet computer; a camera; a personal gaming system; an IoT device (e.g., a sensor, a smart home appliance, or the like); an M2M device; or another type of mobile computation and communication device. UE 205 may send traffic to and/or receive traffic from PDN 250 via base station 210, SGW 215, and/or PGW/SCEF 225.

Base station 210 may each include one or more network devices that receive, process, and/or transmit traffic, such as calls, audio, video, text, and/or other data, destined for and/or received from UE 205. In one example, base station 210 may be part of an LTE network, a 5G network, another advanced network, etc. Base station 210 may receive traffic, destined for UE 205, from SGW 215, PGW/SCEF 225, and/or PDN 250, and may output the traffic to UE 205. Base station 210 may also receive traffic from UE 205, and may output the traffic to its intended destination via SGW 215, PGW/SCEF 225, and/or PDN 250.

SGW 215 may include one or more network devices that gather, process, search, store, and/or provide information in a manner described herein. SGW 215 may, for example, aggregate traffic received from one or more base stations 210, and may send the aggregated traffic to PDN 250 via PGW/SCEF 225.

MME 220 may include one or more computation and communication devices that perform operations to register UE 205 with the EPS, to establish bearer channels associated with a session with UE 205, to hand off UE 205 from the EPS to another network, to hand off UE 205 from the other network to the EPS, and/or to perform other operations. MME 220 may perform policing operations on traffic destined for and/or received from UE 205.

MME trigger component 222 may include one or more computation and communications devices that perform operations described in greater detail below. For example, MME trigger component 222 may communicate with SCEF trigger component 227 to facilitate messaging between application server 255 and UE 205. In some embodiments, MME trigger component 222 may include one or more devices that are communicatively coupled to MME 220. In some embodiments, MME trigger component 222 may be implemented by the same physical device, or set of devices, that implement MME 220. Operations described herein, as being performed by MME trigger component 222, may be performed in whole or in part by MME 220, in some embodiments. Similarly, operations described herein, as being performed by MME 220, may be performed in whole or in part by MME trigger component 222, in some embodiments.

PGW/SCEF 225 may include one or more network devices that gather, process, search, store, and/or provide information in a manner described herein. PGW/SCEF 225 may aggregate traffic received from one or more SGWs 215, etc. and may send the aggregated traffic to PDN 250. PGW/SCEF 225 may also, or alternatively, receive traffic from PDN 250 and may send the traffic toward UE 205 via base station 210 and/or SGW 215.

PCRF 230 may include one or more devices that aggregate information to and from the EPC network and/or other sources. PCRF 230 may receive information regarding policies and/or subscriptions from one or more sources, such as subscriber databases and/or from one or more users (such as, for example, an administrator associated with PCRF 230).

HSS/AAA server 235 may include one or more devices that manage, update, and/or store, in a memory associated with HSS/AAA server 235, profile information associated with a subscriber. HSS/AAA server 235 may perform authentication, authorization, and/or accounting operations associated with the subscriber and/or a communication session with UE 205.

SMSC 240 and SGs-IWF may facilitate the sending of Short Messaging Service ("SMS") messages to and/or from UE 205. In some embodiments, SMSC 240 and/or SGs-IWF 245 may be implemented as a single device or set of devices, while in other embodiments SMSC 240 and SGs-IWF 245 may be implemented as distinct devices or sets of devices.

PDN 250 may include one or more wired and/or wireless networks. For example, PDN 250 may include an IP-based PDN, a wide area network ("WAN") such as the Internet, a private enterprise network, and/or one or more other networks. UE 205 may connect, through PGW/SCEF 225, to data servers, application server 255, other UEs 205, and/or to other servers or applications that are coupled to PDN 250. PDN 250 may be connected to one or more other networks, such as a public switched telephone network ("PSTN"), a public land mobile network ("PLMN"), and/or another network. PDN 250 may be connected to one or more devices, such as content providers, applications, web servers, and/or other devices, with which UE 205 may communicate.

Application server 255 may include one or more devices (e.g., a device and/or a collection of devices) that communicate with UE 205. For example, application server 255 may implement an application related to the function of UE 205, in the case where UE 205 is, or includes, an IoT device. Additionally, or alternatively, application server 255 may implement an application that communicates with an application executed by UE 205.

Figure 3:
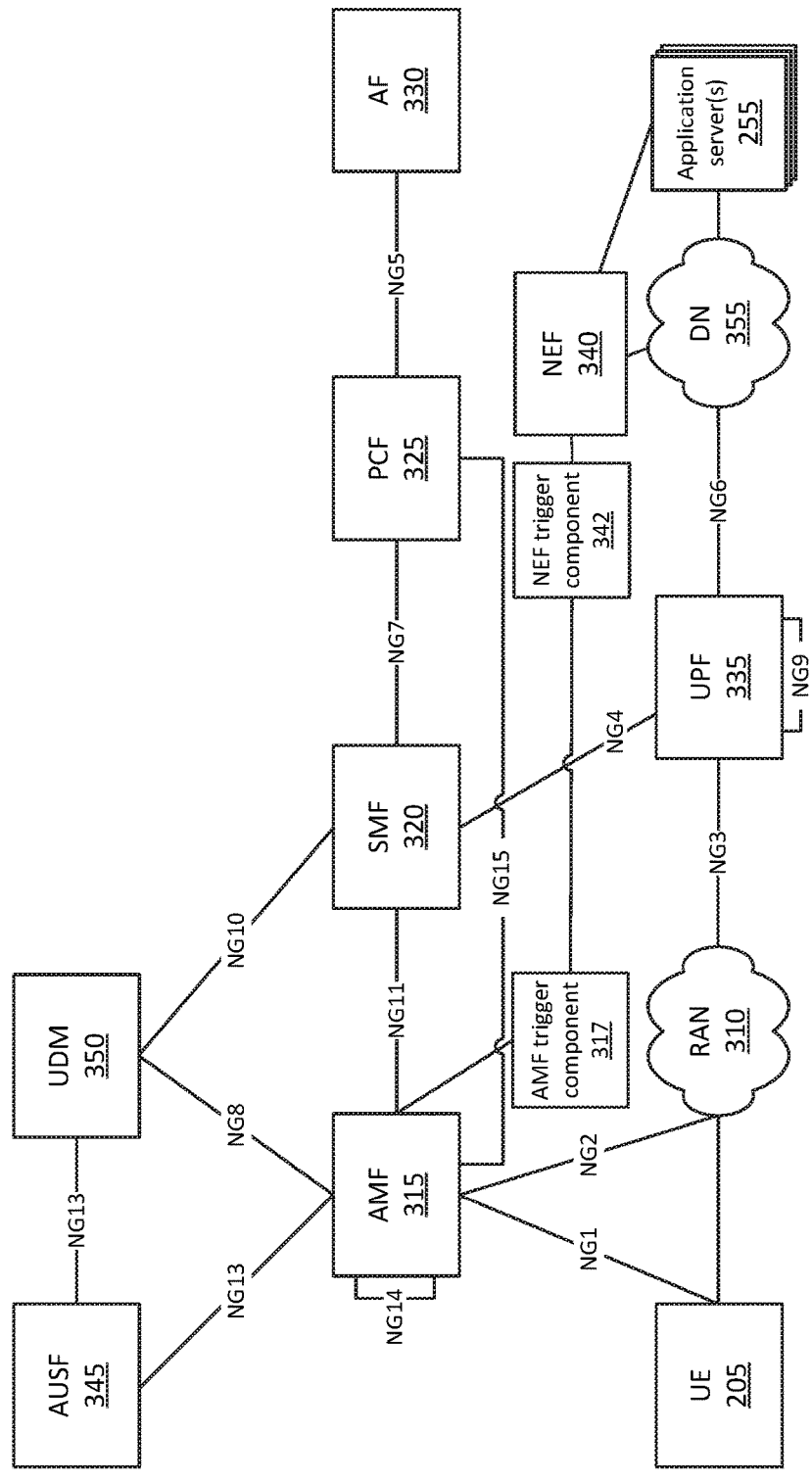

FIG. 3 illustrates another example environment 300, in which one or more embodiments may be implemented. Generally speaking, similar operations may be performed in environment 200 as in environment 300, in order to efficiently deliver messages to UE 205. Environment 300 may correspond to a 5G network, and/or may include elements of a 5G network.

As shown in FIG. 3, environment 300 may include UE 205, RAN 310, AMF 315, AMF trigger component 317, Session Management Function ("SMF") 320, Policy Control Function ("PCF") 325, Application Function ("AF") 330, User Plane Function ("UPF") 335, Network Exposure Function ("NEF") 340, NEF trigger component 342, Authentication Server Function ("AUSF") 345, Unified Data Management ("UDM") 350, and Data Network ("DN") 355.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

RAN 310 may be, or may include, a 5G RAN that includes one or more base stations, via which UE 205 may communicate with one or more other elements of environment 300. UE 205 may communicate with RAN 310 via an air interface. For instance, RAN 310 may receive traffic (e.g., voice call traffic, data traffic, messaging traffic, signaling traffic, etc.) from UE 305 via the air interface, and may communicate the traffic to UPF 335, and/or one or more other devices or networks. Similarly, RAN 310 may receive traffic intended for UE 305 (e.g., from UPF 335, and/or one or more other devices or networks) and may communicate the traffic to UE 305 via the air interface.

AMF 315 may include one or more computation and communication devices that perform operations to register UE 305 with the 5G network, to establish bearer channels associated with a session with UE 305, to hand off UE 305 from the 5G network to another network, to hand off UE 305 from the other network to the 5G network, and/or to perform other operations. In some embodiments, the 5G network may include multiple AMFs 315, which communicate with each other via the NG14 interface (denoted in FIG. 3 by the line marked "NG14" originating and terminating at AMF 315).

AMF trigger component 317 may include one or more computation and communications devices that perform operations described in greater detail below. For example, AMF trigger component 317 may communicate with NEF trigger component 342 to facilitate messaging between application server 255 and UE 205. In some embodiments, AMF trigger component 317 may include one or more devices that are communicatively coupled to AMF 315. In some embodiments, AMF trigger component 317 may be implemented by the same physical device, or set of devices, that implement AMF 315. Operations described herein, as being performed by AMF trigger component 317, may be performed in whole or in part by AMF 315, in some embodiments. Similarly, operations described herein, as being performed by AMF 315, may be performed in whole or in part by AMF trigger component 317, in some embodiments.

SMF 320 may include one or more network devices that gather, process, store, and/or provide information in a manner described herein. SMF 320 may, for example, facilitate in the establishment of communication sessions on behalf of UE 305. In some embodiments, the establishment of communications sessions may be performed in accordance with one or more policies provided by PCF 325.

PCF 325 may include one or more devices that aggregate information to and from the 5G network and/or other sources. PCF 325 may receive information regarding policies and/or subscriptions from one or more sources, such as subscriber databases and/or from one or more users (such as, for example, an administrator associated with PCF 325).

AF 330 may include one or more devices that receive, store, and/or provide information that may be used in determining parameters (e.g., quality of service parameters, charging parameters, or the like) for certain applications.

UPF 335 may include one or more devices that receive, store, and/or provide data (e.g., user plane data). For example, UPF 335 may receive user plane data (e.g., voice call traffic, data traffic, etc.), destined for UE 205, from DN 355, and may forward the user plane data toward UE 205 (e.g., via RAN 310, SMF 320, and/or one or more other devices). In some embodiments, multiple UPFs 335 may be deployed (e.g., in different geographical locations), and the delivery of content to UE 305 may be coordinated via the NG9 interface (e.g., as denoted in FIG. 3 by the line marked "NG9" originating and terminating at UPF 335). Similarly, UPF 335 may receive traffic from UE 205 (e.g., via RAN 310, SMF 320, and/or one or more other devices), and may forward the traffic toward DN 355. In some embodiments, UPF 335 may communicate (e.g., via the NG4 interface) with SMF 320, regarding user plane data processed by UPF 335. As mentioned above, this information may aid SMF 320 in monitoring (e.g., tracking, counting, etc.) the traffic for particular subscribers.

NEF 340 may include one or more devices that expose capabilities and/or events, securely allow for information to be passed between external networks and/or devices (e.g., application server 255 and/or DN 355) and one or more other devices of environment 300, and provide for translation of messaging from one protocol to another. NEF trigger component 342 may include one or more computation and communications devices that perform operations described in greater detail below. For example, NEF trigger component 342 may communicate with AMF trigger component 317 to facilitate messaging between application server 255 and UE 205. In some embodiments, NEF trigger component 342 may include one or more devices that are communicatively coupled to NEF 340. In some embodiments, NEF trigger component 342 may be implemented by the same physical device, or set of devices, that implement NEF 340. Operations described herein, as being performed by NEF trigger component 342, may be performed in whole or in part by NEF 340, in some embodiments. Similarly, operations described herein, as being performed by NEF 340, may be performed in whole or in part by NEF trigger component 342, in some embodiments.

AUSF 345 and UDM 350 may include one or more devices that manage, update, and/or store, in one or more memory devices associated with AUSF 345 and/or UDM 350, profile information associated with a subscriber. AUSF 345 and/or UDM 350 may perform authentication, authorization, and/or accounting operations associated with the subscriber and/or a communication session with UE 305.

DN 355 may include one or more wired and/or wireless networks. For example, DN 355 may include an IP-based PDN, a WAN such as the Internet, a private enterprise network, and/or one or more other networks. UE 205 may communicate, through DN 355, with data servers, application servers 255, other UEs 205, and/or to other servers or applications that are coupled to DN 355. DN 355 may be connected to one or more other networks, such as a public switched telephone network ("PSTN"), a PLMN, and/or another network. DN 355 may be connected to one or more devices, such as content providers, applications, web servers, and/or other devices, with which UE 205 may communicate.

Figure 4:
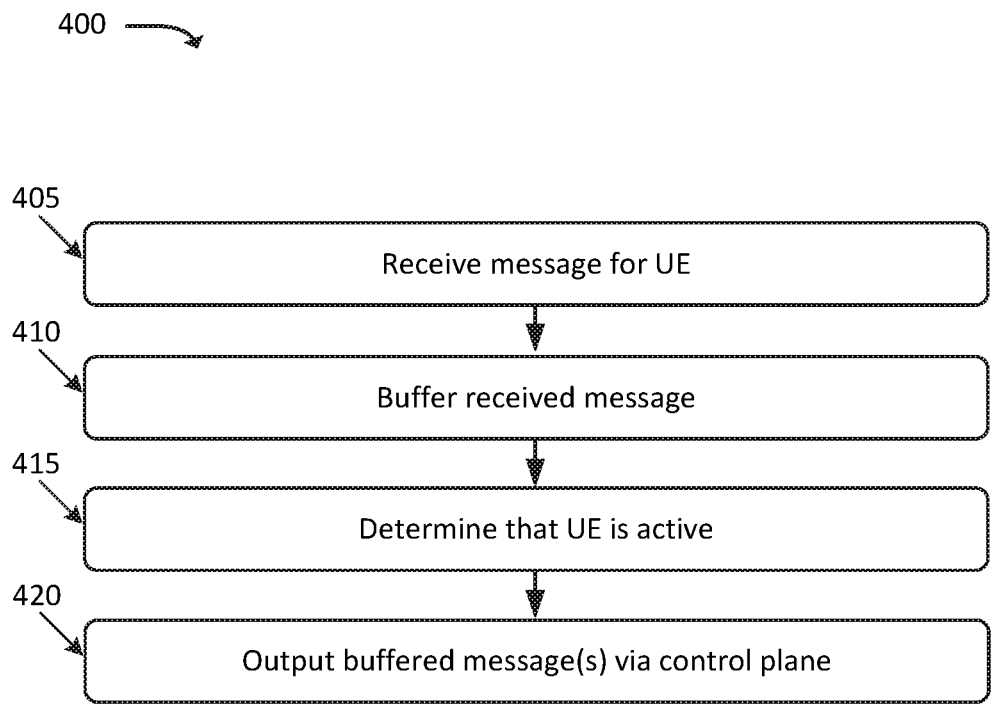
FIG. 4 illustrates a flowchart of an example process for delivering messages to a device that is inactive.

FIG. 4 illustrates an example process 400 for sending data to a UE (e.g., an IoT device that frequently is in an inactive state, and/or another device that is in an inactive state at the time that a message is sent to the device). In some embodiments (e.g., embodiments that employ the network shown in FIG. 2), some or all of process 400 may be performed by SCEF trigger component 227 and/or MME trigger component 222. In some embodiments, (e.g., embodiments that employ the network shown in FIG. 3), some or all of process 400 may be performed by AMF trigger component 317 and/or NEF trigger component 342).

As shown, process 400 may include receiving (at 405) a message for a UE. For instance, SCEF trigger component 227 (or NEF trigger component 342) may receive a message from application server 255 (e.g., via SCEF 225 or NEF 340, respectively). The message may include identifying information for UE 205, such as a mobile directory number ("MDN"), Internet Protocol ("IP") address, and/or some other identifying information. The message may include a request for information, configuration information (e.g., information used to configure UE 205, such as a firmware update or operational parameters), and/or other data. As mentioned above, SCEF trigger component 227 (or NEF trigger component 342) may implement an application programming interface ("API,") such as a Representational State Transfer ("REST") API, via which application server 255 can send and/or receive data from SCEF trigger component 227 (or NEF trigger component 342).

In some embodiments, SCEF trigger component 227 (or NEF trigger component 342) may maintain a mapping of one type of UE identifier to another type. In some embodiments, HSS/AAA server 235 (or UDM 350) may maintain the mapping, and SCEF trigger component 227 (or NEF trigger component 342) may query HSS/AAA server 235 (or UDM 350) to obtain the other type of identifier. For instance, when sending a message to UE 205, application server 255 may identify the UE by a name or other unique identifier, and SCEF trigger component 227 (or NEF trigger component 342) may determine that the name or other unique identifier is associated with (e.g., mapped to) an MDN, an International Mobile Subscriber Identity ("IMSI") value, an International Mobile Station Equipment Identity ("IMEI"), an IP address, and/or other suitable identifier via which UE 205 can be reached.

Process 400 may further include buffering (at 410) the received message. For instance, SCEF trigger component 227 (or NEF trigger component 342) may buffer (e.g., store) the message. As discussed below, the message may be buffered until SCEF trigger component 227 (or NEF trigger component 342) is notified that UE 205 is active (or otherwise available to receive the message). In some embodiments, when receiving and/or buffering the message, SCEF trigger component 227 (or NEF trigger component 342) may request a status of UE 205 (e.g., active or inactive). The status may be requested (e.g., "pulled") from MME trigger component 222 (or AMF trigger component 317). In some embodiments, SCEF trigger component 227 (or NEF trigger component 342) may maintain information indicating the status of UE 205 (and one or more other UEs). The status information may be based on information provided (e.g., "pushed") by MME trigger component 222 (or AMF trigger component 317). For instance, when receiving information from MME trigger component 222 (or AMF trigger component 317) that UE 205 is inactive, SCEF trigger component 227 (or NEF trigger component 342) may update the stored status information for UE 205 to indicate that UE 205 is inactive.

When receiving information from MME trigger component 222 (or AMF trigger component 317) that UE 205 is active (e.g., has "woken up"), SCEF trigger component 227 (or NEF trigger component 342) may update the stored status information for UE 205 to indicate that UE 205 is active. In some embodiments, the information from MME trigger component 222 (or AMF trigger component 317) may indicate a duration that UE 205 will remain active, and SCEF trigger component 227 (or NEF trigger component 342) may automatically update the status information for UE 205 to indicate that UE 205 is inactive after the expiration of the duration. In some embodiments, if a message is received (at 405) for UE 205 while UE 205 is active, then SCEF trigger component 227 (or NEF trigger component 342) may forgo buffering (at 410) the message and proceed to block 420. In some embodiments, if the message is received while UE 205 is active, but is about to become inactive, then SCEF trigger component 227 (or NEF trigger component 342) may buffer the message and wait until UE 205 is active again. For example, assume that a message is received for UE 205 while UE 205 is active, but UE 205 is scheduled to become inactive within a threshold amount of time (e.g., within 0.1 seconds of receiving the message). Because the remaining duration may not be long enough to forward the message to UE 205 (e.g., the remaining duration of UE 205 being active is less than the threshold amount of time), it may be undesirable to attempt to forward the message to UE 205.

Process 400 may additionally include determining (at 415) that the UE is active. For example, some time after the message is buffered (and assuming that UE 205 is inactive or otherwise unavailable when the message is received from application server 255), SCEF trigger component 227 (or NEF trigger component 342) may determine that UE 205 is active. For example, SCEF trigger component 227 (or NEF trigger component 342) may receive a message from MME trigger component 222 (or AMF trigger component 317) indicating that UE 205 is active. In some embodiments, SCEF trigger component 227 (or NEF trigger component 342) may determine that UE 205 is active based on communicating with MME 220 (or AMF 315). MME 220 (or AMF 315) may determine that UE 205 is active based on receiving a tracking area update ("TAU") message or other control signaling from UE 205, and/or using any suitable technique to detect that UE 205 is active (e.g., has gone from an inactive or disconnected state to an active state).

Process 400 may further include outputting (at 420) the buffered message to the UE via control plane signaling. For example, based on determining that UE 205 is active, SCEF trigger component 227 (or NEF trigger component 342) may forward the message to UE 205. For example, as described below, the message may be provided to UE 205 via MME trigger component 222 and/or MME 220 (or AMF trigger component 317 and/or AMF 315). In other words, the message may be provided to UE 205 via control plane signaling, as opposed to via user plane signaling. In this manner, application server 255 is essentially enabled to communicate messages to UE 205 via control plane signaling, which may be faster than via user plane messaging (e.g., messaging via SMS messaging). In some embodiments, the message from application server 255 may include a request for information, which may be responded to by UE 205 while UE 205 is active. In some embodiments, the reply message from UE 205 may also be sent to application server 255 via control signaling (e.g., via MME trigger component 222 and/or MME 220 (or AMF trigger component 317 and/or AMF 315).

Figure 5:
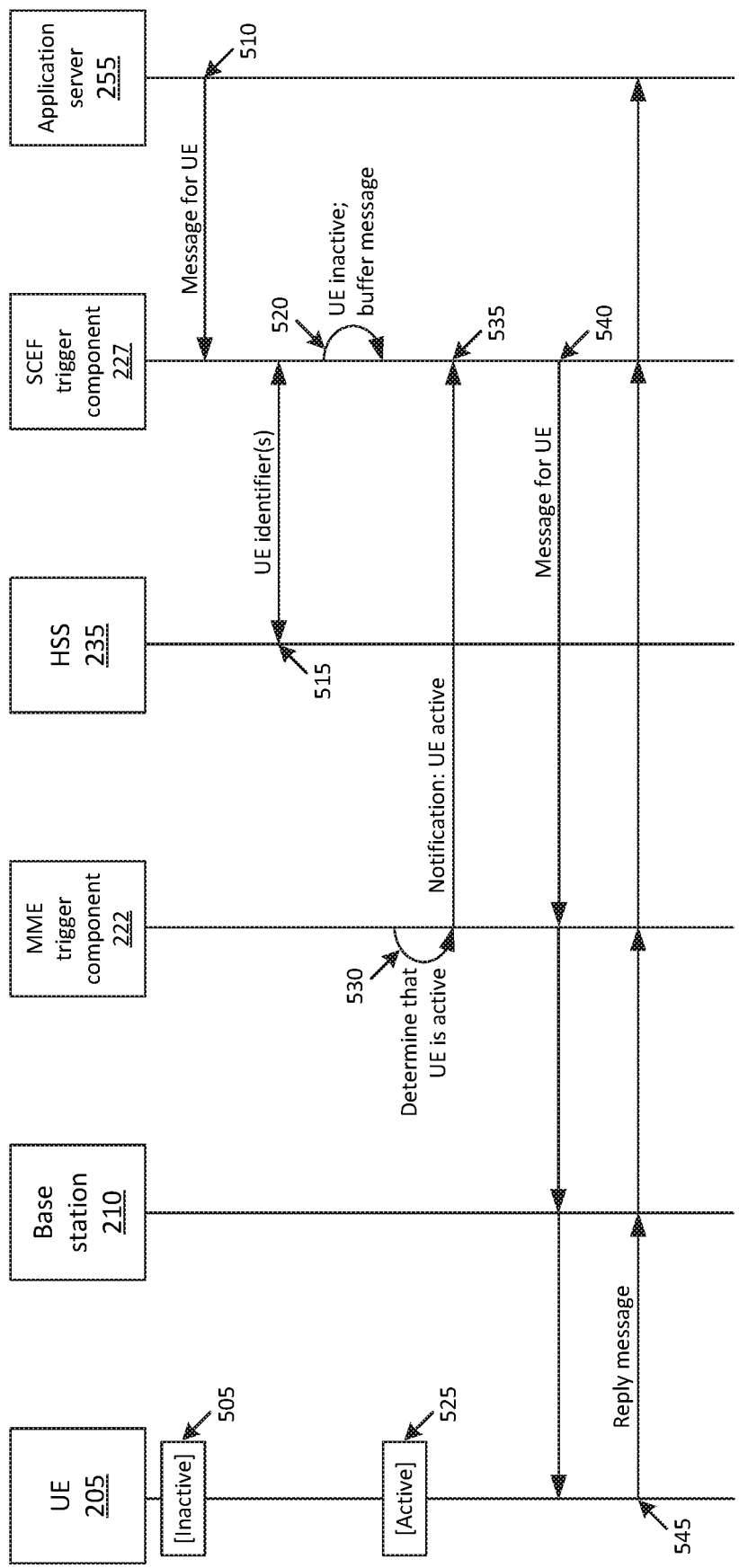
FIG. 5 illustrates a signal flow of an example process for delivering messages to a device that is inactive.

FIG. 5 illustrates an example signal flow that may be used in accordance with some embodiments to deliver messages to UE 205 (e.g., when UE 205 is inactive at the time the message is sent). FIG. 5 is described in the context of the network shown in FIG. 2. However, in practice, similar signaling may be performed by one or more other types of networks. For instance, when performed by the network shown in FIG. 3, operations described here as being performed by SCEF trigger component 227 may be performed by NEF trigger component 342; operations described as being performed by MME trigger component 222 may be performed by AMF trigger component 317; and operations described as being performed by HSS/AAA server 235 may be performed by UDM 350.

As shown, assume that UE 205 is inactive (at 505). While UE 205 is inactive, application server 255 may output (at 510), to SCEF trigger component 227, a message for UE 205. As mentioned above, application server 255 may communicate with SCEF trigger component 227 via an API or some other type of communication interface. The message may include an identifier of UE 205, which may be distinct from an identifier (e.g., an IMSI value, an IMEI value, an MDN, and/or some other identifier) used by components of the network to communicate with UE 205. The identifier included in the message may be, for example, a name and/or other identifier used by application server 255 to differentiate UE 205 from other UEs. In some embodiments, application server 255 may, however, include an identifier (e.g., an IMSI, IMEI, etc.) used by components of the network to communicate with UE 205.

In situations where the message from application server 255 does not include an identifier of a certain type, used by components of the network to communicate with UE 205 (e.g., when the message does not include an IMSI value, an IMEI value, etc.), SCEF trigger component 227 may obtain (at 515) the suitable identifier (e.g., from HSS/AAA server 235). For example, HSS/AAA server 235 may maintain a mapping of identifiers, used by application server 255, to other types of identifiers used by the network (e.g., IMSI values, IMEI values, etc.).

SCEF trigger component 227 may determine (at 520) that UE 205 is inactive. As mentioned above, SCEF trigger component 227 may maintain information regarding the status of UE 205. For instance, when UE 205 went into an inactive state, SCEF trigger component 227 may have received an indication (e.g., from MME trigger component 222) indicating that UE 205 is inactive. In some embodiments, SCEF trigger component 227 may request (not shown) the status of UE 205 from, for example, MME trigger component 222, when the message is received (at 510). As yet another example, if information regarding the status of UE 205 is not available (e.g., SCEF trigger component 227 has not previously stored an indication that UE 205 is inactive, and/or if SCEF trigger component 227 is otherwise unable to determine the status of UE 205), SCEF trigger component 227 may operate under the assumption that UE 205 is unreachable. When determining that UE 205 is unreachable, SCEF trigger component 227 may buffer the message received from application server 255.

In some embodiments, buffering the message may entail identifying a payload portion of the message, and storing the payload portion of the message. In some embodiments, SCEF trigger component 227 may forgo storing the message with the identifier included in the original message (at 510), and may instead store the message with one or more identifiers received from HSS/AAA server 235 (at 515). For instance, SCEF trigger component 227 may construct a packet, set of packets, or other data structure(s) that include (1) the payload of the original message and (2) the one or more identifiers received from HSS/AAA server 235.

At some point after the message has been buffered (at 520), UE 205 may become active (at 525). For instance, UE 205 may power on, may activate wireless transceiver circuitry to communicate with base station 210, may exit an area with poor reception, and/or may otherwise transition from an inactive state to an active state with respect to the network. MME trigger component 222 may determine (at 530) that UE 205 has become active. For example, MME trigger component 222 may receive an indication from MME 220 regarding the active status of UE 205. As discussed above, MME 220 may use any suitable mechanism to determine that UE 205 has become active, including receiving control messaging from UE 205. In some embodiments, UE 205 may actively output a notification (e.g., to MME 220, SCEF 225, and/or another device or system) that indicates that UE 205 is active. In some embodiments, this notification may include an Access Point Name ("APN") or another type of context identifier (described in further detail below).

Based on determining that UE 205 has become active, MME trigger component 222 may notify (at 535) SCEF trigger component 227 that UE 205 has become active. The notification may include one or more of the identifiers of a similar type or format received from HSS/AAA server 235 (e.g., an IMSI value, an IMEI value, etc.). Using this identifier, SCEF trigger component 227 may identify the buffered message (along with any other messages that have been buffered for UE 205), and output (at 540) the message to MME trigger component 222.

In some embodiments, the message (outputted at 540) may include a context identifier, such as an APN or other unique identifier that can be used by SCEF trigger component 227 to correlate other messages to this message. MME trigger component 222 may also retain the APN for similar purposes (e.g., to differentiate the present message, as well as other messages that are associated with a same context/flow, from other messaging contexts or flows). MME trigger component 222 may, in some embodiments, also store identifying information for SCEF trigger component 227 (e.g., to differentiate SCEF trigger component 227 from other SCEF trigger components 227 and/or SCEFs 225).

MME trigger component 222 may reconstruct, extract, encapsulate, and/or otherwise reformat the message to a suitable format to forward the message to UE 205. For example, MME trigger component 222 may create a downlink non-access stratum ("NAS") message, addressed to UE 205 (e.g., using an IMSI value, an IMEI value, and/or some other type of identifier), that includes the payload of the original message (received at 510), and send the NAS message to UE 205 via base station 210. In some embodiments, the NAS message may also include the APN.

In some scenarios, the payload of the message may include a request for information. For instance, in the scenario where UE 205 is (or includes) an IoT device that includes one or more sensors, the request for information may be a request for one or more sensor readings (which UE 205 may have previously taken and stored).

In some embodiments, the payload of the message may include an instruction to establish a PDN connection. For example, application server 255 may have further data to send to application server 255 (e.g., streaming content, large data files, etc.), which may be too large in size to send via MME trigger component 222. For example, the amount of data to be sent may exceed a threshold size or length.

Additionally, or alternatively, application server 255 may anticipate or request a relatively large amount of data from UE 205 in response to the message from application server 255 (e.g., application server 255 may request video or image content, or other types of data that exceed a threshold size or length). As yet another example, application server 255 may instruct UE 205 to establish a PDN connection when data to be sent to or from UE 205 exceeds a threshold duration. For example, application server 255 may instruct UE 205 to establish the PDN connection when it is determined that UE 205 should send data (e.g., real-time temperature sensor readings, real-time streaming video captured by a camera associated with UE 205, etc.) to UE 205 for a minute, an hour, and/or some other duration of time. In scenarios where the payload of the message includes an instruction to establish a PDN connection, UE 205 may request (e.g., to MME 220, SCEF 225, and/or some other device) that a PDN bearer be established between UE 205 and SCEF 225 (not shown in FIG. 5).

In some embodiments, the NAS message, sent by MME trigger component 222, may include an indication that an acknowledgement message ("ACK") is required from UE 205. In some embodiments, the ACK message may be used to provide a response to the message from application server 255 (e.g., sensor readings taken by UE 205 in response to a request for the sensor readings). As shown, UE 205 may output (at 545) a reply message. The reply message may, in some embodiments, be in the form of an ACK message in response to the NAS message sent by MME trigger component 222. The ACK message may notify MME trigger component 222 that the NAS message was received by UE 205, and may further include a payload that includes data intended for application server 255. In some embodiments, the payload may be formatted as one or more DIAMETER protocol packets. In some embodiments, the reply message from UE 205 may also include the APN, which may be used by MME trigger component 222 to identify that the reply message is a reply to the NAS message sent by MME trigger component 222 to UE 205.

MME trigger component 222 may forward the message to SCEF trigger component 227. For example, MME trigger component 222 may use the previously stored information, identifying SCEF trigger component 227, to determine that the message should be sent to that particular SCEF trigger component 227 (e.g., may select the particular SCEF trigger component 227 from a set of candidate SCEF trigger components 227 or SCEFs 225). SCEF trigger component 227 may forward the message to application server 255. In some embodiments, prior to forwarding the message to application server 255, SCEF trigger component 227 may reformat the message (e.g., add and/or remove information) and/or otherwise reconstruct a message to send to application server 255. The message sent by SCEF trigger component 227 to application server 255 may include, for example, some or all of the message payload provided by UE 205, and the identifier of UE 205, originally included in the message from application server 255 (sent at 510).

Figure 6:
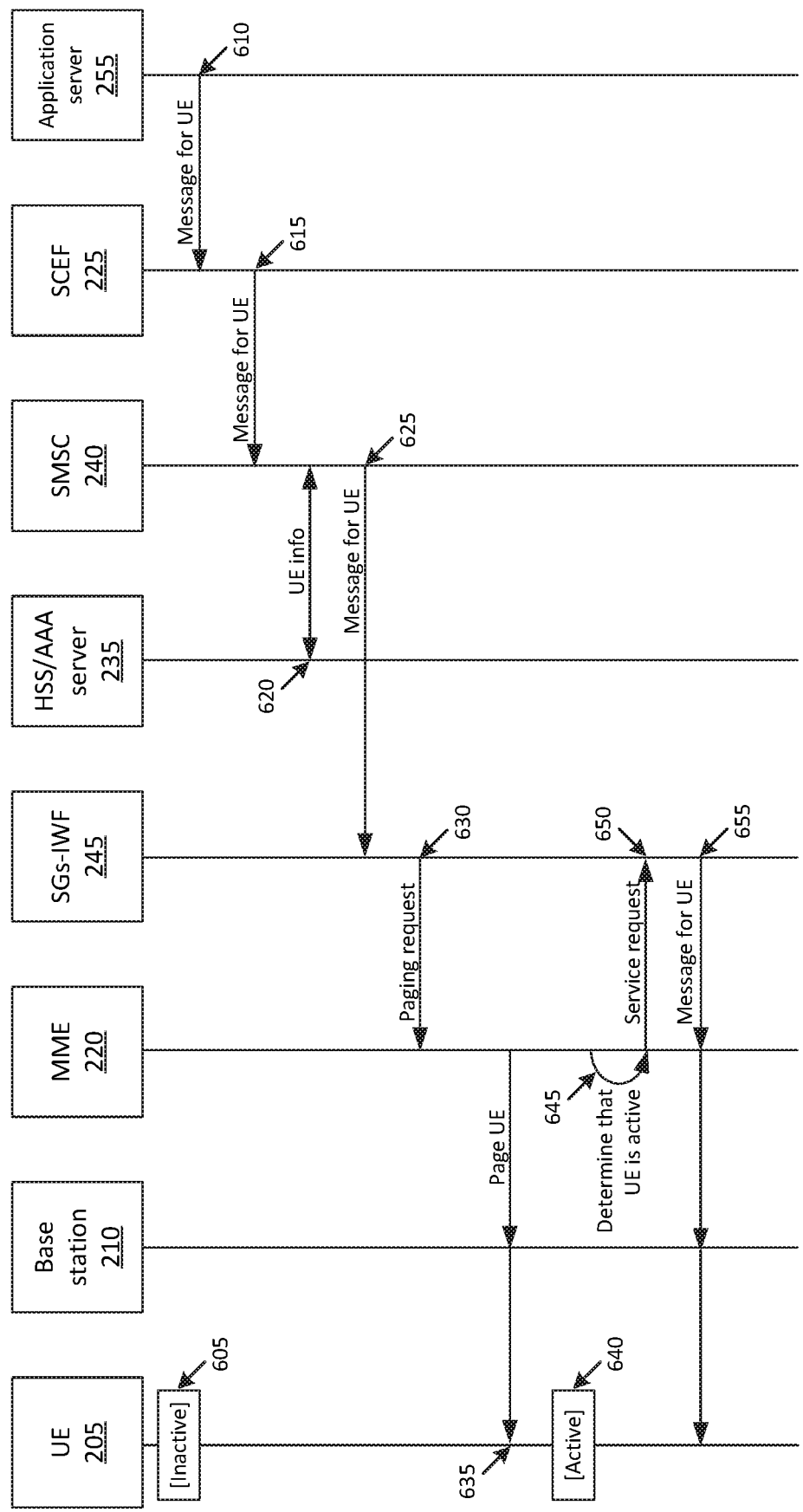
FIG. 6 illustrates a signal flow of another technique for delivering messages to a device that is inactive.

FIG. 6 illustrates a process that uses SMS-based messaging. FIG. 6 is discussed here in the context of the devices shown in FIG. 2. As shown, assume that UE 205 is in an inactive state (at 605). Application server 255 may output (at 610) a message to UE 205. SCEF 225 may forward (at 615) the message to SMSC 240, which may obtain (at 620) information needed to forward the message, as an SMS message, to UE 205. For example, SMSC 240 may request Mobile Application Part ("MAP") sendRoutingInfo ("SRI") for Short Message ("SM") information, based on which SMSC 240 can forward (at 625) the message (e.g., as an SMS message) to SGs-IWF 245. SGs-IWF 245 may output (at 630) a paging request to MME 220, based on which MME 220 may page (at 635) UE 205.

Based on the paging, UE 205 may become active (at 640), and MME 220 may detect (at 645) that UE 205 has become active. Based on detecting that UE 205 is active, MME 220 may request (at 650) the message from SGs-IWF 245, which may provide (at 655) the message to MME 220. MME 220 may reformat the message (e.g., as an NAS message) and forward the message to UE 205.

The embodiment shown in FIG. 5 may be faster, more efficient, and/or robust than other techniques (e.g., due to the simplified direct communication channel between SCEF 225 and MME 220 (or NEF 340 and AMF 315)). For example, since the embodiment of FIG. 5 waits for UE 205 to become active (e.g., as opposed to paging UE 205 when messages are available), the embodiment of FIG. 5 does not cause UE 205 to wake up more often than an owner and/or operator of UE 205 may have intended. Additionally, forgoing the use of SMS for paging or message delivery (e.g., according to the embodiment shown in FIG. 5), limitations of SMS messaging may not be introduced (e.g., the introduction of latency and/or delay, the requirement for certain devices, such as SGs-IWF 245 and/or SMSC 240, etc.).

Figure 7:
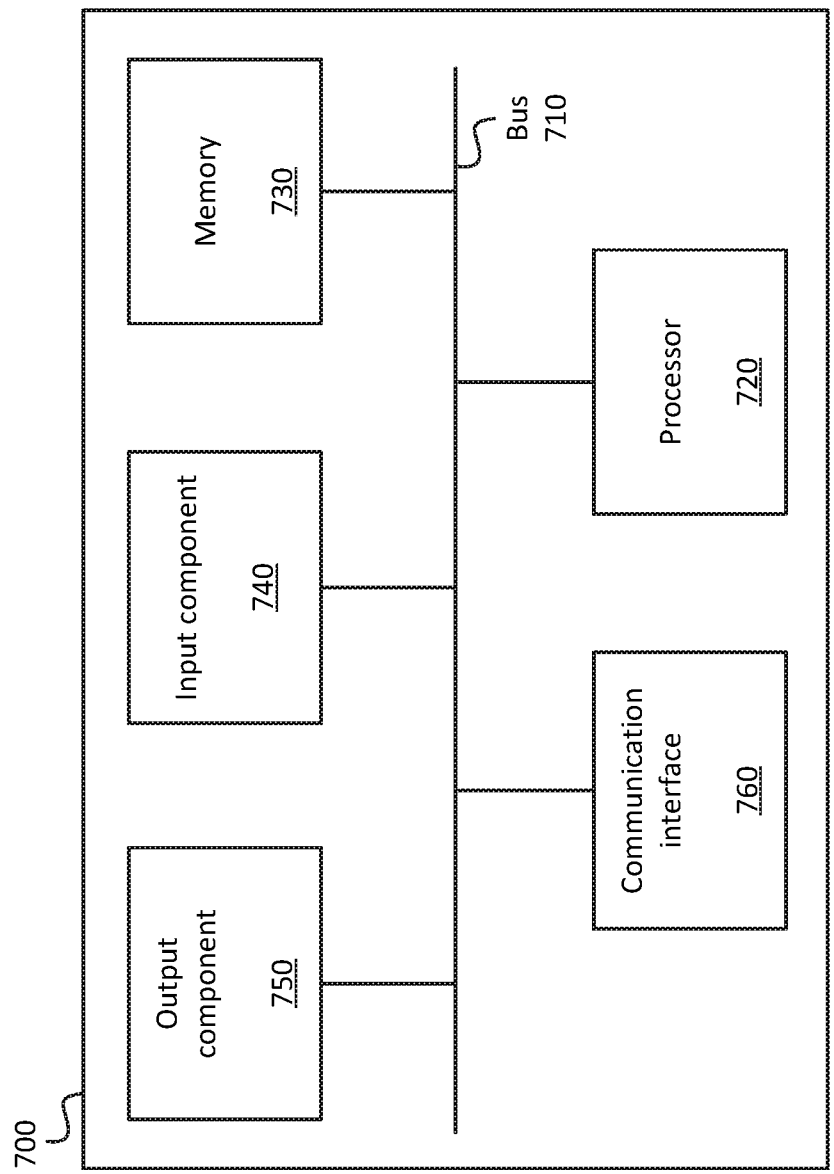
FIG. 7 illustrates example components of one or more devices, according to one or more embodiments described herein.

FIG. 7 illustrates example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while embodiments are described above in the context of UEs being active or inactive, similar embodiments may be applicable to UEs that are reachable or unreachable for whatever reason, respectively. As an example, while FIG. 4 is described in the context of a UE that is inactive and becomes active (e.g., "wakes up"), similar embodiments may apply to a UE that is unreachable for some other reason (e.g., may enter a region with low or no wireless reception and/or some other reason for not being able to receive traffic from, or otherwise be located by, the network) and becomes reachable (e.g., enters a region with wireless reception).

Additionally, while series of blocks and/or signals have been described with regard to FIG. 4-6, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate con text.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   a non-transitory computer-readable medium storing a set of processor-executable instructions; and
   one or more processors configured to execute the set of processor-executable instructions, wherein executing the set of processor-executable instructions causes the one or more processors to:
   receive, from a particular application server out of a plurality of application servers, a message destined for a user equipment ("UE") associated with a wireless telecommunications network, the message including a payload;
   buffer the received message;
   after buffering the received message, receive a notification, from a particular network device, of the wireless telecommunications network, that has determined that the UE has transitioned from a first state to a second state, the notification indicating that the UE is in the second state;
   determine or identify a context identifier associated with the received message;

output, based on receiving the notification, the buffered message, including the context identifier, to the UE via the particular network device, wherein the particular network device forwards at least the payload of the message and the context identifier to the UE;
receive, from the UE and after outputting the buffered message, a reply message;
identify that the reply message includes the context identifier associated with the message received from the particular application server;
select the particular application server, from the plurality of application servers, based on the identified context identifier being associated with the message received from the particular application server; and
forward at least a portion of the reply message, including the context identifier, to the selected particular application server.

2. The device of claim 1, wherein the receiving, buffering, and outputting are performed by at least one of:
a Service Capability Exposure Function ("SCEF") of the wireless telecommunications network, or
one or more devices communicatively coupled to the SCEF.

3. The device of claim 1, wherein the message is received via a Representational State Transfer ("REST") application programming interface ("API").

4. The device of claim 1, wherein executing the processor-executable instructions further causes the one or more processors to:
determine, after receiving the message, that the UE is not in the second state,
wherein the message is buffered based on determining that the UE is not in the second state.

5. The device of claim 1, wherein the UE is associated with a device identifier, wherein the notification includes the device identifier, wherein executing the processor-executable instructions further causes the one or more processors to:
store information correlating the device identifier, associated with the UE, to the context identifier;
determine that the device identifier, included in the notification, matches the device identifier associated with the UE; and
determine that the buffered message should be outputted based on the context identifier, associated with the message, matching the context identifier that is correlated with the device identifier.

6. The device of claim 1, further including a network exposure function ("NEF") of the wireless telecommunications network that performs the selecting of the particular application server and the forwarding of the at least the portion of the reply message.

7. The device of claim 1, wherein the notification is received from an Access and Mobility Management Function ("AMF") of the wireless telecommunications network.

8. A non-transitory computer-readable medium, storing a set of processor-executable instructions, which, when executed by one or more processors of a device, cause the one or more processors to:
receive, from a particular application server out of a plurality of application servers, a message destined for a user equipment ("UE") associated with a wireless telecommunications network, the message including a payload;
buffer the received message;
after buffering the received message, receive a notification, from a particular network device, of the wireless telecommunications network, that has determined that the UE has transitioned from a first state to a second state, the notification indicating that the UE is in the second state;
determine or identify a context identifier associated with the received message;
output, based on receiving the notification, the buffered message, including the context identifier, to the UE via the particular network device, wherein the particular network device forwards at least the payload of the message and the context identifier to the UE;
receive, from the UE and after outputting the buffered message, a reply message;
identify that the reply message includes the context identifier associated with the message received from the particular application server;
select the particular application server, from the plurality of application servers, based on the identified context identifier being associated with the message received from the particular application server; and
forward at least a portion of the reply message, including the context identifier, to the selected particular application server.

9. The non-transitory computer-readable medium of claim 8, wherein the device that performs the receiving, buffering, and outputting, by executing the set of processor-executable instructions, includes at least one of:
a Service Capability Exposure Function ("SCEF") of the wireless telecommunications network, or
one or more devices communicatively coupled to the SCEF.

10. The non-transitory computer-readable medium of claim 8, wherein the processor-executable instructions to receive the message include processor-executable instructions to use a Representational State Transfer ("REST") application programming interface ("API") to receive the message.

11. The non-transitory computer-readable medium of claim 8, wherein the set of processor-executable instructions further include processor-executable instructions to:
determine, after receiving the message, that the UE is not in the second state,
wherein the message is buffered based on determining that the UE is not in the second state.

12. The non-transitory computer-readable medium of claim 8, wherein the UE is associated with a device identifier, wherein the notification includes the device identifier, wherein the set of processor-executable instructions further includes processor-executable instructions to:
store information correlating the device identifier, associated with the UE, to the context identifier;
determine that the device identifier, included in the notification, matches the device identifier associated with the UE; and
determine that the buffered message should be outputted based on the context identifier, associated with the message, matching the context identifier that is correlated with the device identifier.

13. The non-transitory computer-readable medium of claim 8, wherein the processor-executable instructions, to receive the notification, include processor-executable instructions to receive the notification from at least one of:
a Mobility Management Entity ("MME") of the wireless telecommunications network, or
one or more devices that are communicatively coupled to the MME.

14. The non-transitory computer-readable medium of claim 8, wherein the selecting of the particular application server and the forwarding of the at least the portion of the reply message is performed by a network exposure function ("NEF") of the wireless telecommunications network.

15. The non-transitory computer-readable medium of claim 8, wherein the notification is received from an Access and Mobility Management Function ("AMF") of the wireless telecommunications network.

16. A method, comprising:
receiving, by a device and from a particular application server out of a plurality of application servers, a message destined for a user equipment ("UE") associated with a wireless telecommunications network, the message including a payload;
buffering, by the device, the received message;
after buffering the received message, receiving, by the device, a notification, from a particular network device, of the wireless telecommunications network, that has determined that the UE has transitioned from a first state to a second state, the notification indicating that the UE is in the second state;
determining or identifying, by the device, a context identifier associated with the received message;
outputting, by the device and based on receiving the notification, the buffered message including the context identifier, to the UE via the particular network device, wherein the particular network device forwards at least the payload of the message and the context identifier to the UE;
receiving, by the device, from the UE, and after outputting the buffered message, a reply message;
identifying, by the device, that the reply message includes the context identifier associated with the message received from the particular application server;
selecting, by the device, the particular application server, from the plurality of application servers, based on the identified context identifier being associated with the message received from the particular application server; and
forwarding, by the device, at least a portion of the reply message, including the context identifier, to the selected particular application server.

17. The method of claim 16, wherein the receiving, buffering, and outputting are performed by at least one of:
a Service Capability Exposure Function ("SCEF") of the wireless telecommunications network, or
one or more devices communicatively coupled to the SCEF.

18. The method of claim 16, further comprising:
determining, after receiving the message, that the UE is not in the second state,
wherein the message is buffered based on determining that the UE is not in the second state.

19. The method of claim 16, wherein the selecting of the particular application server and the forwarding of the at least the portion of the reply message is performed by a network exposure function ("NEF") of the wireless telecommunications network.

20. The method of claim 16, wherein the notification is received from an Access and Mobility Management Function ("AMF") of the wireless telecommunications network.

\* \* \* \* \*